(12) United States Patent
Gallagher et al.

(10) Patent No.: US 8,917,574 B2
(45) Date of Patent: Dec. 23, 2014

(54) VIBRATION ISOLATION SECTION

(75) Inventors: Andrew John Gallagher, Castle Hill (AU); Donald Innes Wallace, Castle Hill (AU)

(73) Assignee: Phoenix Engineering Systems Pty Ltd, Castle Hill, NSW (AU)

( * ) Notice: Subject to any disclaimer, the term of this patent is extended or adjusted under 35 U.S.C. 154(b) by 848 days.

(21) Appl. No.: 12/678,861

(22) PCT Filed: Sep. 17, 2008

(86) PCT No.: PCT/AU2008/001371
§ 371 (c)(1),
(2), (4) Date: Mar. 18, 2010

(87) PCT Pub. No.: WO2009/036495
PCT Pub. Date: Mar. 26, 2009

(65) Prior Publication Data
US 2010/0208550 A1 Aug. 19, 2010

(30) Foreign Application Priority Data
Sep. 19, 2007 (AU) .................................. 2007905117

(51) Int. Cl.
*G01V 1/38* (2006.01)
*G01V 1/20* (2006.01)

(52) U.S. Cl.
CPC ........................................ *G01V 1/201* (2013.01)
USPC .............................................. 367/20; 367/15

(58) Field of Classification Search
CPC ...................................................... G01V 1/201
USPC ............... 114/215, 244, 253; 174/47; 267/69; 367/20, 144, 172
See application file for complete search history.

(56) References Cited

U.S. PATENT DOCUMENTS

| | | | |
|---|---|---|---|
| 3,353,817 A * | 11/1967 | Bollinger | ........................ 267/69 |
| 3,868,623 A * | 2/1975 | Abbott | .......................... 367/172 |
| 4,090,168 A | 5/1978 | Miller et al. | |
| 4,628,851 A | 12/1986 | Appling | |
| 5,062,085 A | 10/1991 | Andrews, Jr. | |
| 5,506,818 A * | 4/1996 | Johnston | ........................ 367/144 |
| 5,745,436 A | 4/1998 | Bittleston | |
| 5,844,860 A | 12/1998 | Miller | |
| 7,184,366 B1 | 2/2007 | Harrick et al. | |

OTHER PUBLICATIONS

International Search Report for PCT/AU2008/001371, Mailing date of International Search Report, Nov. 7, 2008.
International Preliminary Report on Patentability for PCT/AU2008/001371, date of completion of report, Sep. 1, 2009.

* cited by examiner

*Primary Examiner* — Daniel L Murphy
(74) *Attorney, Agent, or Firm* — Pearne & Gordon LLP

(57) ABSTRACT

According to the present invention there is provided a vibration isolation section for use in a seismic streamer system, the section including:
a resilient sheath arranged to be connected end-to-end in a seismic streamer system and receive axial loads transmitted through the system, wherein the resilient sheath is configured to stretch upon receiving an axial load and substantially convert the axial load into a radial stress; and
a support structure housed within the resilient sheath, the support structure including one or more members having substantially constant diameter under load which provides a reaction to the radial stress, thereby providing attenuation to the received axial load.

13 Claims, 3 Drawing Sheets

VIBRATION ISOLATION SECTION

FIELD OF THE INVENTION

The present invention relates generally to the field of marine seismic survey apparatus. More particularly, the invention relates to vibration isolation sections, otherwise known as stretch sections, used in marine seismic streamer systems to reduce noise.

PRIOR ART

It is to be noted that a reference to prior art herein is not an admission that the prior art is common general knowledge to a person skilled in the art or any other person in any sense whatsoever.

Marine seismic survey apparatus typically include arrays of seismic sensors disposed in a structure that is towed by a seismic vessel through a body of water, such as a lake or the ocean. Such seismic receiver structures are commonly known as streamers.

Streamers are typically made in segments of about 75, 100 or 150 m in length. A streamer may include 100 or more such segments coupled end-to-end to form the complete streamer. Each streamer segment generally includes one or more high strength members that extend the length of the streamer segment. The streamer is generally constructed to allow for buoyancy trimming by means of adding buoyancy or ballast in order to achieve neutral buoyancy in the towing environment. Electrical and/or optical acoustic sensors are disposed along the length of the streamer at spaced apart locations. Electrical and/or optical cables extend along the length of the streamer and are coupled to the sensors so as to transmit signals generated by the sensors in response to sound energy to a recording device, which may be on the seismic vessel or at another location. Other conductors may be used to transmit electrical power. The streamer segment typically includes a combination of mechanical and electrical/optical coupling at each of its axial ends so that the streamer segment can be coupled to another such streamer segment, telemetry module or, through a stretch location, to a lead in cable, explained further below, coupled to the seismic vessel. The mechanical aspect of the coupling transfers axial force from segment to segment and ultimately to the seismic vessel through the lead in cable.

In a typical seismic survey acquisition system, one or more streamers made as described above are towed behind the seismic vessel in the water. In acquisition systems having more than one streamer, the streamers are typically laterally separated from each other by coupling their forward ends at spaced apart positions to a spreader cable that extends transversely to the direction of motion of the seismic vessel. The spacing is maintained by placing the spreader cable under tension by the use of diverters or paravanes that generate a transverse force by virtue of being towed through the water. These devices are simply aerofoils generating lift in the transverse direction.

The lead in cable includes a plurality of electrical and/or optical conductors that are essentially completely surrounded by one or more layers of helically wound steel wires. The steel wires are referred to as armour and protect the conductors from damage, and transmit axial load between the vessel and the streamers.

A particular issue that concerns marine seismic survey acquisition systems is a type of noise created by movement of the water past the lead in cable and the spreader cable. The noise is sometimes known as strumming and such noise can be of a nature so as to materially adversely affect the quality of the seismic signals detected by the sensors in the streamers. Other types of noise that affect the streamers include mechanically generated noise in the diverters and fluctuations in the towing speed caused by variations in water conditions. One device known in the art for reducing transmission of such noise between the lead in cable and the streamer is known as a vibration isolation section or stretch section.

A stretch section can be formed similar to a streamer segment, as described above, with the principal differences being that the strength member in the stretch section is typically formed from a more elastic material than that used for streamer segments. Lengths would typically be in the order of 50 m to 100 m. Existing designs of this type have the advantage that they can be reeled onto a seismic drum and offer high back deck operational efficiency during streamer deployment and retrieval. However, they have several significant disadvantages which are that their length leads to longer offsets for the streamer relative to the source, they are easily damaged and are filled with an oil-based fluid which presents environmental and safety issues. These products tend to have good attenuation at frequencies lower than around 8 Hz due to the low overall stiffness afforded by the long length. The product has a low loss tangent but achieves good attenuation at frequencies higher than about 12 Hz due to accumulation of loss over the long length.

Another type of device for reducing such noise transmission is configured as a solid, elastomer cylinder of a selected length typically between 1 m and 10 m. These devices tend to offer the advantage of being very short, leading to low streamer offsets but tend to be of a significantly larger diameter. Such products tend to be very heavy and, due to their large diameter, cannot be handled by the normal streamer handling and storage equipment fitted in seismic vessels and need to be manually added into the streamer on deployment and removed out of the streamer on recovery. This presents significant operational efficiency problems as well as health and safety problems to the seismic operators. These products tend to have good attenuation at frequencies in the 3 Hz to 8 Hz range due to the low axial stiffness but offer very little attenuation at frequencies less than 3 Hz. The product generally has poorer attenuation at frequencies higher than about 12 Hz due to a relatively low loss tangent and very short length.

Another type of device in use is known as the radial stretch. This device consists of a cross-ply hose type construction enclosing a fixed volume of liquid, which is typically oil based, and having a typical length of 10 to 20 m. In this product, axial strain of the stretch is converted into radial strain in the hose by virtue of the hose containing constant internal volume of liquid. This construction allows for a low axial stiffness in a relatively small diameter and has a higher loss tangent than the other section types due to hose material choice and the cross ply construction. One of the key parameters in determination of the stiffness is the helical angle of the cross ply construction whereby larger helical wrap angles lead to lower axial stiffness. In the constant volume model, the highest angle achievable is in the region of 55 degrees and this represents a limit to the design. Fibres arranged at angles between 55 degrees and 90 degrees go into compression when the stretch is subjected to axial strain and therefore do not contribute to the stiffness at those angles. This product offers the advantage of being able to be handled by existing streamer recovery, deployment and storage equipment and its attenuation performance at low and high frequencies is good as a result of being able to offer a low stiffness and a high loss tangent. However, it has been noted that this product is not effective at frequencies less than around 3 Hz. The key disadvantage of this product is that medium axial loads are translated into very high pressures in the fixed volume of oil, typically a 20 KN axial load could translate into a 50 bar internal pressure. Because the product relies on a fixed volume, any kind of small puncture of the hose, or failure of various seals and joints in the product leads to loss of liquid and inevitable failure of the stretch. Furthermore, the leakage itself, which may be high pressure, presents health, safety and environmental problems for the seismic contractor. The hose construction and the presence of very high pressures in the liquid during normal operations can render the product more likely to suffer a failure in the field.

Another type of stretch device is one constructed by attaching a number of stretch type members sometimes known as shock cords between two opposing plates. There may be up to between 10 or 15 stretch members fitted in parallel and lengths could be in the order of 1 m to 10 m. The plates tend to be of a fairly large diameter compared to other stretch products and similar or larger diameter than the elastomer cylinder type referred to above. The advantage of this kind of device is that it is fairly easy to adjust the stiffness properties by changing the length and or the number of shock cords fitted. The attenuation performance of the device in the 3 Hz to 10 Hz range can be very good due to the low stiffness achievable but performance at higher frequencies is typically poor due to the typically low loss tangent of the shock cords. However, it has been noted that the device does not offer useful attenuation in the sub-3 Hz range. Short lengths also lead to lower streamer offsets that are desirable. The key disadvantage is that such products cannot be handled easily by the normal streamer handling and storage equipment fitted in seismic vessels and need to be manually added into the streamer on deployment and removed out of the streamer on recovery. This presents significant operational efficiency problems as well as health and safety problems to the seismic operators.

It is an object of the invention to overcome some of the problems of the prior art or at least provide a useful alternative.

SUMMARY OF THE INVENTION

According to the present invention there is provided a vibration isolation section for use in a seismic streamer system, the section including:
  a resilient sheath arranged to be connected end-to-end in a seismic streamer system and receive axial loads transmitted through the system, wherein the resilient sheath is configured to stretch upon receiving an axial load and substantially convert the axial load into a radial stress; and
  a support structure housed within the resilient sheath, the support structure including one or more members having substantially constant diameter under load which provides a reaction to the radial stress, thereby providing attenuation to the received axial load.

Preferably the resilient sheath is an elastic sheath.

Preferably the support structure has a coiled-spring structure of substantially constant diameter. Alternatively, the support structure may be in the form of a plurality of spaced apart hoop-shaped members arranged along the length of the sheath.

In preferred embodiments, the sheath has a structure including one or, more layers of helically wrapped fibres. Ideally, the layers are embedded in a resilient material where the resilient material preferably is a natural or a synthetic rubber material, or a polyurethane material. Preferred embodiments provide the fibres wrapped at an angle between 55° and 90° relative to a central axis of the sheath.

The present invention advantageously provides a vibration isolation section which provides the performance and operational advantages of the radial stretch concept without necessitating the use of an inner sealed volume of liquid.

In preferred embodiments the helical wrap angle achievable is advantageously not limited in the same way as for the constant volume liquid model. Fibres may be arranged at angles higher than 55 degrees and will go into tension for any axial strain. This means that it is possible to design structures with a lower stiffness than is possible with the constant volume liquid model for the same diameter and length.

The low stiffness achievable with the present invention enables short lengths to be achieved leading to low offsets that are desirable in seismic operations. This low stiffness also allows high levels of attenuation to be achieved at low frequencies.

DRAWINGS

Preferred embodiments of the present invention will now be described with reference to the accompanying drawings, in which.

DETAILED DESCRIPTION OF EMBODIMENTS OF THE INVENTION

Figure 1:
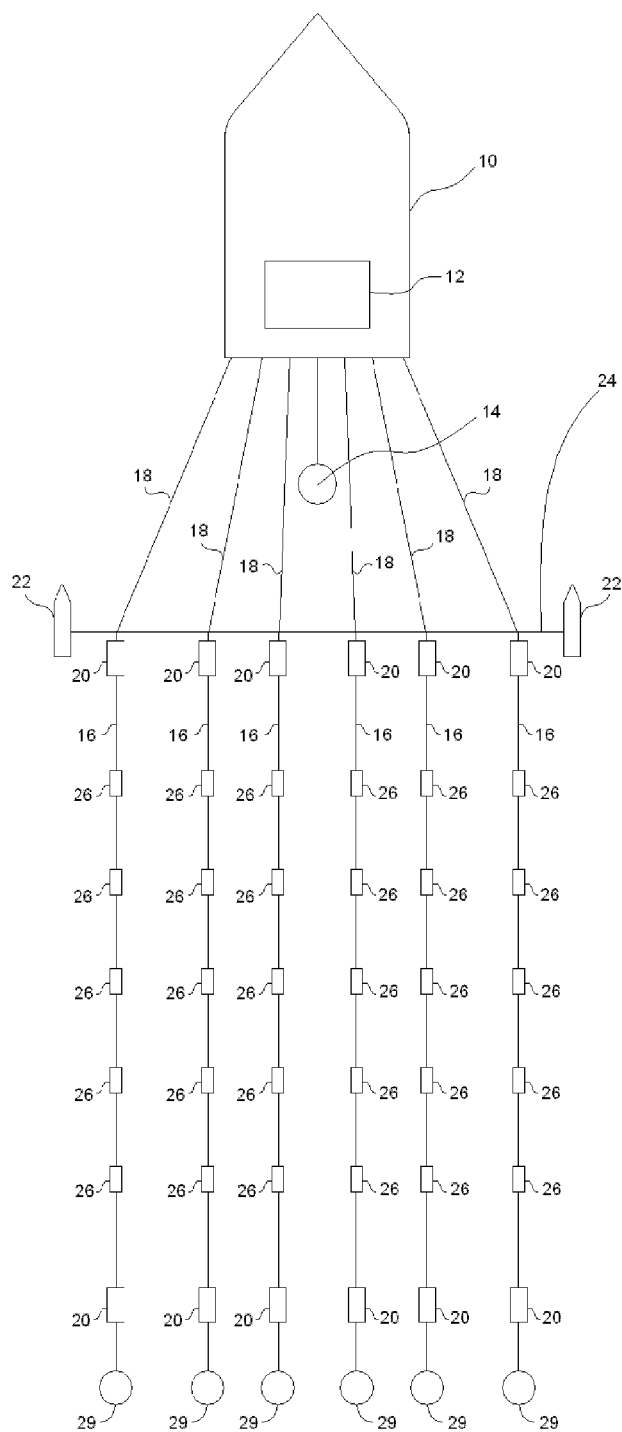
FIG. 1 shows a marine seismic acquisition system in which a vibration isolation section according to the present invention can be used.

It is to be noted where possible features common to the various embodiments illustrated in the drawings are referred to in each drawing by a respective common feature number.

A marine seismic acquisition system is shown in FIG. 1. The seismic data acquisition system includes a seismic vessel 10 towing a plurality of laterally spaced apart seismic streamers 16 through a body of water such as a lake or the ocean. The seismic vessel 10 typically includes instrumentation thereon collectively called a recording system, shown generally at 12. The recording system 12 may include navigation devices, electrical power supplies, data recording equipment and seismic source actuation equipment of types well known in the art. The data recording equipment (not shown separately for clarity of the illustration) makes recordings, typically indexed with respect to time of actuation of a seismic energy source 14, of signals detected by seismic sensors 26 disposed at spaced apart locations along the streamers 16.

The streamers 16, as explained previously, can be made from a plurality of segments (not shown separately). A streamer may include many such segments coupled end-to-end to form the complete streamer 16. Each streamer segment may include one or more high strength members (not shown) that extend the length of the streamer segment. Electrical and/or optical sensors 26 are disposed along the length, of the strength member at spaced apart locations. Electrical and/or optical conductors (not shown) in a cable extend along the length of the streamer 16 and are coupled to the sensors 26 so as to transmit signals to the recording system 12 that are generated by the sensors 26 in response to seismic energy. The streamer segments may include a combination of mechanical and electrical/optical coupling (not shown) at each of their axial ends so that the streamer segments can each be coupled to another such streamer segment, telemetry module or to a lead in cable 18.

There is shown one lead in cable 18 for each of the streamers 16 to couple each of the streamers 16 mechanically, and electrically and/or optically to the seismic vessel 10. Mechanical coupling enables the vessel 10 to pull the streamers 16 through the water. Electrical and/or optical coupling enables signals from the sensors 26 to be carried to the recording system 12. The lead in cable 18 may include electrical and/or optical conductors (not shown) surrounded by helically wound steel armour wires. The conductors carry the signals and/or carry electrical power. The armour wires transmit axial force from the vessel 10 for towing, and protect the conductors from damage.

In the seismic acquisition system shown in FIG. 1, the streamers 16 are towed at laterally spaced apart positions with respect to each other. Lateral separation is maintained between the streamers 16 by coupling the lead in end of each streamer 16 to a spreader cable 24. The spreader cable 24 extends generally transversely to the direction of motion of the seismic vessel 10, and includes at each of its ends a diverter 22. The diverters 22 act co-operatively with motion of the water as the seismic acquisition system is towed through the water such that tension is maintained on the spreader cable 24.

The seismic energy source 14 can be of any type known in the art for marine seismic data acquisition. FIG. 1 shows the source 14 being towed by the seismic vessel 10. Alternative arrangements may include a plurality of such seismic energy sources, or may have one or more seismic energy sources towed by a different vessel.

As shown in FIG. 1, each streamer 16 includes a tail buoy 29 at the end most distant from the seismic vessel 10. The tail buoys 29 may include navigation and/or signal telemetry devices known in the art, such as a global positioning system (GPS) receiver and wireless data telemetry transceiver.

All of the foregoing components of a marine seismic data acquisition system may be of types well known in the art. Particular specifications for any of the foregoing components of a marine seismic data acquisition system are a matter of discretion for the designer and user of such systems, and are therefore not limitations on the scope of the invention.

In FIG. 1, each streamer 16 is coupled to its respective lead in cable 18 using a vibration isolation section 20. The streamers 16 may also be coupled to their respective tail buoys 29 using a similar vibration isolation section 20. The vibration isolation sections 20 provide a resilient and preferably elastic coupling between the respective streamers 16 and lead in cables 18, and if used between the streamer 16 and the respective tail buoys 29, such that vibrations coming into the streamer 16 from the head end or the tail end are substantially attenuated.

Figure 2A:
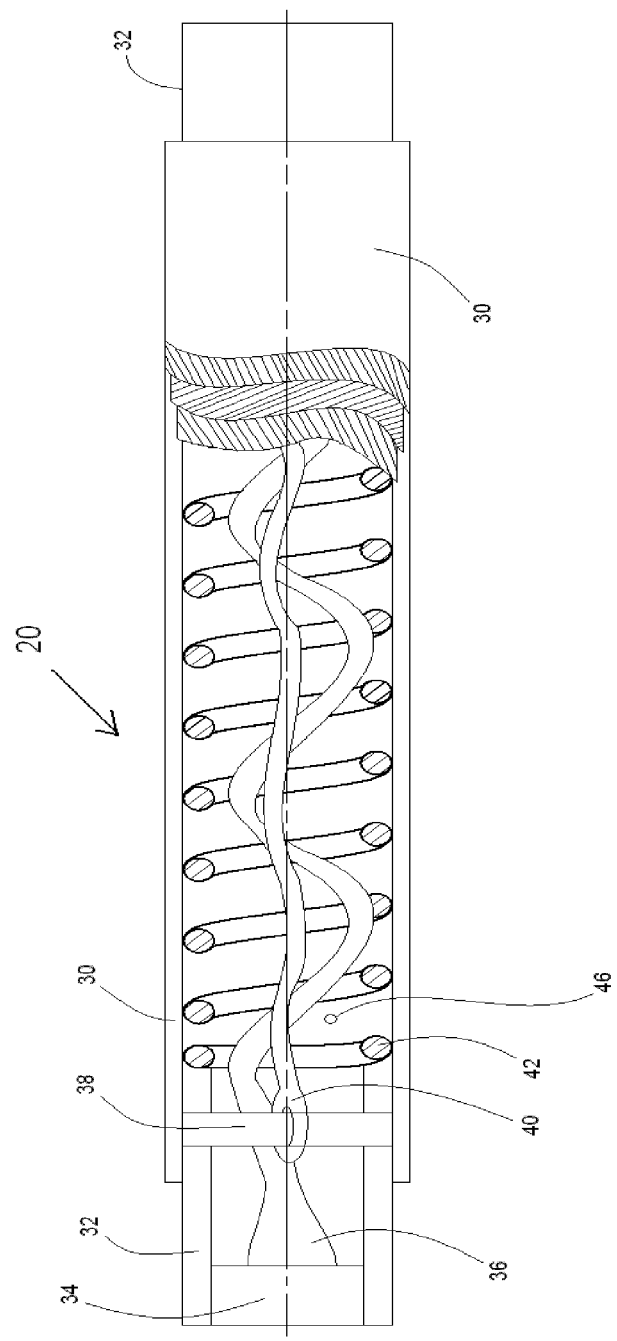
FIG. 2a shows a partial cross-sectional view of a vibration isolation section according to a preferred embodiment of the present invention.
Figure 2B:
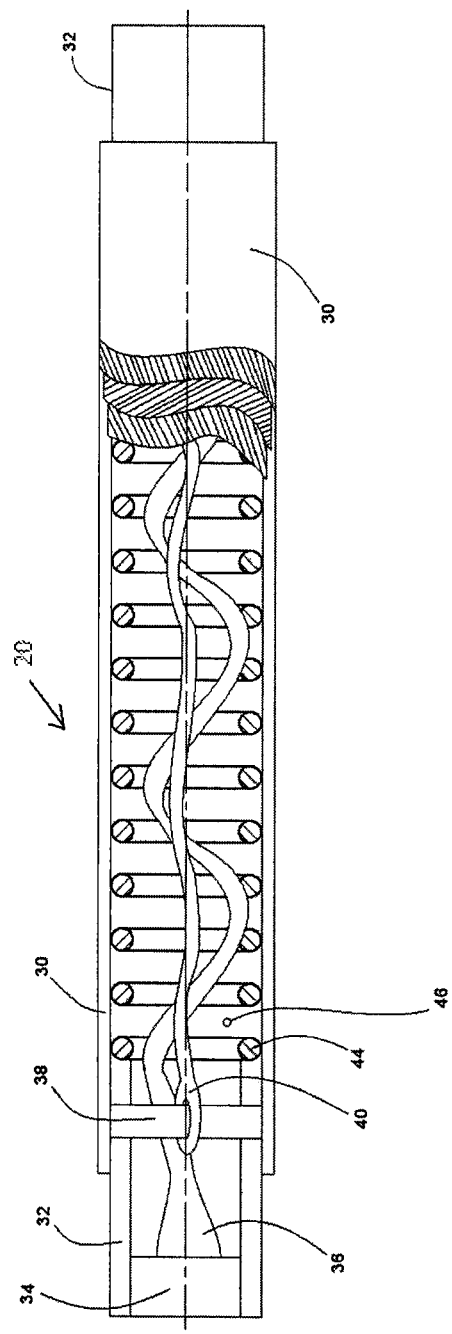
FIG. 2b shows a partial cross-sectional view of an alternative embodiment of the vibration isolation section.

Alternative embodiments of the vibration isolation section 20 are shown in FIGS. 2a and 2b. The section 20 includes a hose-like elastic sheath 30. The elastic sheath 30 has a cross-ply construction using a number of layers of helically wrapped fibres embedded in a matrix of a rubber material. The fibres may be of a high strength fibre but can be a polyester material. The matrix may be of a rubber-type material, such as a natural rubber or synthetic rubber material, e.g neoprene. The rubber-type material may ideally have a high loss tangent. The wrap angle of the fibres at zero axial load may ideally be higher than 55 degrees relative to central axis.

When the elastic sheath 30 receives axial loads transmitted through the streamer system, to which it is connected, the elastic sheath 30 is caused to stretch. The construction of the sheath 30 is such as to provide a radial stress upon stretching. In other words, the received axial load is substantially converted into a radial stress.

The sheath 30 is attached to a connector housing 32, for example by means of a bonding technique such as vulcanisation or by swaging or crimping or some combination of those techniques. The connector housing 32 is constructed such that it is able to transmit the mechanical force between the section 20 and the attached components. The connector housing 32 may be manufactured from a high strength material, such as titanium.

An electrical or electrical/optical connector insert 34 is mounted inside the connector housing 32 at each end of the section 20 and is of a configuration suited to the wiring scheme of the streamer that the section is intended to be fitted to.

The two connectors inserts 34 are fitted to either end of an electrical or electrical/optical harness 36 which is of a construction such that it is subjected to very small strains when the stretch is fully extended. The construction can be in the form of helical coil.

As shown, a pin 38 is fitted into the connector housing 32 and a snubber rope 40. The pin 38 transmits force between the connector housing 32 and the snubber rope 40 in the event that the stretch is extended to a snubbing length.

The snubber rope 40 is of a length such that it takes up axial load when the sheath 30 is extended to its snubbing length. Any further force is taken up by the snubber rope 40 instead of the sheath 30, and further extension is limited by the stiffness of the snubber rope 40. The snubber rope 40 is of a high strength construction such as Kevlar and designed to fail at a load significantly higher than the snubbing load. This prevents damage to the sheath 30 under excessive loads.

The sheath 30 is radially supported by a support structure 42, 44 that reacts against the radial stress in the sheath 30 when it is extended axially. The support structure 42, 44 maintains a near constant diameter under load within the operating range of the stretch. The support structure is shown in FIG. 2a is in the form of low pitch coiled spring 42. The alternative structure shown in FIG. 2b is in the form of a series of hoops 44.

The support structure 42, 44 can be conveniently provided with a relatively small diameter, for example, less than 100 mm. Similarly, it has been found that the section 20 exhibits useful attenuation with relatively small lengths, for example, between 5 m and 10 m. It will be appreciated by persons skilled in the art that larger dimensions could be employed.

While the support structures 42, 44 are shown as being separate from the sheath 30, it is anticipated that the support structures 42, 44 could in fact be integrally formed with the sheath 30.

It has been found that in order for the vibration isolation section 20 to operate it is not necessary for the support structure 42, 44 to absorb any axial load.

The support structures 42, 44 advantageously permits a flexibility which would allow the vibration isolation section to be reeled onto a conventional seismic drum during streamer deployment and retrieval.

It will be appreciated that other forms of solid support structures, such as a cylindrical structure, could be employed to exhibit the necessary constancy of diameter and reaction to radial stress. However, such structures would lose the flexibility advantage for reeling the section onto a drum and would require the section to be connected during streamer deployment.

The support structure 42, 44 effectively removes any need to provide an internal volume of liquid in order to react to the radial stress.

The internal cavity 46, defined within the sheath 30, may be free flooding whereby water may enter and exit freely via holes (not shown) designed into the sheath 30 or connector housing 32. Alternatively the assembly may be sealed and the internal cavity 46 may contain a gas such as air or nitrogen.

The invention has been described by way of example only with reference to preferred embodiments which is not intended to introduce limitations on the scope of the invention. It will be appreciated by persons skilled in the art that alternative embodiments exist even though they may not have been described herein which remain within the scope and spirit of the invention as broadly described herein.

The invention claimed is:

1. A vibration isolation section for use in a seismic streamer system, said section including:
   a resilient sheath arranged to be connected end-to-end in a seismic streamer system and receive axial loads transmitted through said system, wherein said resilient sheath is configured to stretch upon receiving an axial load and substantially convert said axial load into a radial stress; and
   a support structure for the resilient sheath and housed within said resilient sheath and arranged to resist at least substantial radial contraction of the sheath when the sheath is stretched, said support structure including one or more members having substantially constant diameter under load which provides a reaction to said radial stress, thereby providing attenuation to said received axial load.

2. The vibration isolation section according to claim 1, wherein the resilient sheath is an elastic sheath.

3. The vibration isolation section according to claim 1, wherein said support structure includes a coiled-spring structure of substantially constant diameter or in the alternative includes a plurality of spaced apart hoop-shaped members arranged along the length of said elastic sheath.

4. The vibration isolation section according to claim 1, wherein said sheath has a structure including one or more layers of helically wrapped fibres.

5. The vibration isolation section according to claim 4, wherein said one or more layers are embedded in a resilient material.

6. The vibration isolation section according to claim 5, wherein said resilient material is a natural or a synthetic rubber material, or a polyurethane material.

7. The vibration isolation section according to claim 4, wherein said fibres are wrapped at an angle between 55° and 90° relative to a central axis of said sheath.

8. The vibration isolation section according to claim 1, wherein said support structure is integrally formed with said sheath.

9. The vibration isolation section according to claim 1, wherein said sheath defines a sealed gas-filled internal cavity.

10. The vibration isolation section according to claim 1, wherein said sheath includes holes for permitting the flow of fluid there through.

11. The vibration isolation section according to claim 1, further including a snubber member for limiting the length that said sheath can be stretched.

12. The vibration isolation section according to claim 11, wherein said snubber member is a rope.

13. A seismic streamer system incorporating one or more vibration isolation sections according to claim 1.

* * * * *